US007100887B2

(12) United States Patent
Multhammer

(10) Patent No.: US 7,100,887 B2
(45) Date of Patent: Sep. 5, 2006

(54) METHOD FOR EMPTYING A SUPPLY LINE FOR COATING UNITS

(75) Inventor: Hans-Jürgen Multhammer, Mallersdorf (DE)

(73) Assignee: Asis GmbH, Landshut (DE)

( * ) Notice: Subject to any disclaimer, the term of this patent is extended or adjusted under 35 U.S.C. 154(b) by 35 days.

(21) Appl. No.: 10/511,400

(22) PCT Filed: Apr. 10, 2003

(86) PCT No.: PCT/EP03/03736

§ 371 (c)(1),
(2), (4) Date: Oct. 14, 2004

(87) PCT Pub. No.: WO03/086671

PCT Pub. Date: Oct. 23, 2003

(65) Prior Publication Data

US 2005/0126598 A1 Jun. 16, 2005

(30) Foreign Application Priority Data

Apr. 14, 2002 (DE) ................................ 102 16 581
Mar. 24, 2003 (DE) ................................ 103 12 973

(51) Int. Cl.
*F16K 7/04* (2006.01)

(52) U.S. Cl. .......................................................... 251/5

(58) Field of Classification Search .................... 251/4, 251/5

See application file for complete search history.

(56) References Cited

U.S. PATENT DOCUMENTS 3,397,860 A * 8/1968 Bushmeyer ................ 251/61.1
3,485,472 A * 12/1969 Bozich .......................... 251/5
3,885,769 A * 5/1975 Morrison ....................... 251/5
5,188,134 A 2/1993 Satoh et al.
5,950,986 A * 9/1999 Daugherty et al. ...... 251/149.6
5,992,818 A * 11/1999 Jones et al. .................... 251/7

FOREIGN PATENT DOCUMENTS

DE 0937321 1/1956

* cited by examiner

*Primary Examiner*—Edward K. Look
*Assistant Examiner*—John K. Fristoe, Jr.
(74) *Attorney, Agent, or Firm*—Abelman, Frayne, Schwab

(57) ABSTRACT

A supply line for supplying coating application devices with coating substances, e.g., paint from one or a plurality of containers containing the coating substance(s), includes a valve device capable of displacing the coating substance in the supply line in a direction opposite the direction of flow of the coating substance from the container into the supply line, with the supply line being radially compressible upon being impinged by pressure medium and with the valve device being arranged at an end of the supply line remote from the one or a plurality of containers so that impinging with the pressure medium is effected in the direction opposite the direction of flow of the coating substance at the time of application of the coating substance.

6 Claims, 1 Drawing Sheet

METHOD FOR EMPTYING A SUPPLY LINE FOR COATING UNITS

BACKGROUND OF THE INVENTION

1. Field of the Invention

The invention relates to a method for emptying supply lines for supplying coating applying devices of a coating unit with coating means such as, for example, paints, from one or a plurality of coating means container(s) or reservoir (s), whereby the supply line has a valve device, which makes it possible that the coating means volume present in the supply line be redirected counter to the direction of flow into a coating means reservoir or a supply line at the time of processing the coating means.

2. Description of the Prior Art

This type of supply line can, for example, be paint ring lines of painting systems but also paint supply lines leading away from the paint ring lines, which are arranged between the ring line and the paint change device.

Particularly when operating painting systems with alternating paints, there has always been the problem that individual components of the painting system must be cleaned prior to a paint change, whereby especially the paint present in the supply lines must be removed. For reasons of environmental protection and costs it is advantageous when doing this, if the paint contained in the supply lines does not have to be discarded but can be redirected back to a paint supply container or to a paint ring line.

The German patent DE-PS 197 09 988, for example, proposes a solution for the cleaning problem of a paint supply line arranged between a paint change device and a paint spray gun, by arranging a displacement body within the supply line and displacing the paint volume present in the supply line by movement of the displacement body against the direction of flow of the paint and out of the supply line and redirecting it into the paint change device or into the paint ring line. Then the supply line is flushed with a solvent in the direction of flow of the paint. The solvent present in the supply line is then pushed by the displacement body, which must be moved back into its starting position anyway, out of the supply line in the direction of flow of the paint. The drawback in this proposed solution is primarily the high control effort for the displacement body movement and the extensive sensor technology for determining the position of the displacement body.

The object of the present invention, starting with the described prior art, is to provide a method for cleaning of a supply line of a coating system such as, for example, a paint ring line or a paint supply line of a painting system, which on the one hand can be realized with the least possible technical input and on the other hand makes it possible to extensively recover the coating means of the coating means volumes or paint volume present in the supply line. Moreover, a further object of the invention is to propose a suitable supply line for this cleaning or emptying method.

SUMMARY OF THE INVENTION

This object is achieved according to the invention in that the coating means is displaced out of the supply line at the time of each coating means change by a continuous deformation of the supply line in the direction of the coating means reservoir or to the supply ring line; in other words, the open cross-section of the supply line is, for example, minimized over practically its entire length by continuous compression of the supply line in the direction of the coating means reservoir or the supply line and a coating means volume present in the supply line is virtually expressed or stripped out of the supply line.

For emptying the supply line with the least possible residues it is advantageous, if the passage cross-section of the supply line is reduced to zero or near zero. The deformation or compression of the supply line is done by application of pressure on the external periphery using a pressure medium, whereby in an advantageous embodiment of the invention the pressure medium is preferably a liquid or a gas such as air, for example, is used.

When this is done, the gaseous or liquid pressure medium is guided in a gap space sealed against the surroundings passed between the supply line and a jacket pipe or jacket tube coaxially enveloping the supply line against the periphery. The supply and removal of the pressure medium in the interstitial space is achieved using connections or valves arranged in the zone of the of the ends of the supply lines. In order that the coating means volume present in the supply line is redirected back into the supply line or the coating means container, the interstitial space flows through against the direction of flow of the coating means with processing of the coating means by the pressure medium, so that expanding gas or liquid columns deforms the supply line continuously in the direction of the supply line or coating means container. When this is done, the supply line is stripped away. After this stripping out or emptying of the supply line the pressure medium is released again from the interstitial space between the supply line and the jacket tube or jacket pipe and the interstitial space consequently depressurized. The intrinsic elasticity of the supply line then renders at least partially reverses the deformation, induced by the pressure medium, of the supply line. A flushing liquid passed through the supply line for removing the coating means residues still present supports the reverse deformation of the supply line as well as forcing out of the pressure medium from the interstitial space.

The cleaning method according to the invention can also be used on the supply lines or the supply ring lines, which are subdivided into a plurality of sections by valves, constriction points, conveyance devices or other devices. The individual sections are thus impinged individually with pressure medium; in other words, the supply line is emptied by application of pressure between partial interrupting the line. A temporally consecutively switched application of pressure of sections adjacent to each other then results in a progressive movement of the coating means towards the coating means container.

A suitable supply line for the implementation of the described emptying process by application of pressure on the external periphery with a pressure medium, configured radially compressible, so that the coating means passage cross-section of the supply line approaches zero (zero passage cross-section). When this is done the supply line can be applied along practically its entire length with pressure medium. By impinging the supply line with pressure medium over practically its entire supply line, the entire coating means is forced or pressed out of the supply line.

In order to assure the most effective stripping out or pressing out of the supply line, it is further provided that the supply line is configured to be foldable into each itself. In virtue of a suitable folding arrangement during the compression process of the supply line can be achieved in that a remaining patent coating means passage cross-section is as minimal as possible; that is, even the coating means volume remaining in the supply line is kept to the minimum possible and the displacement of the coating means is as effective as possible out of the supply line. When this is done the folding into itself of the supply line at the time of application of pressure can still be supported by longitudinal reinforcements etc. arranged on the supply line.

In an advantageous single embodiment of the invention the supply line consists of a pliable elastic, radially compressible coating-means carrying hose, which is surrounded by a jacket hose or jacket tube, whereby the interstitial or annular space between the coating—means carrying tube and the jacket hose or jacket tube is connected to a valve device, so that said interstitial space can be impinged using a pressure medium. This pressure medium introduced into the interstitial space effects a pressure force on the external periphery of the hose and so changes its external contour; that is, the hose is compressed. Because, when this is done, the pressure medium affects also the inner periphery of the jacket hose or jacket tube, in a advantageous further embodiment of the inventive concept it is also proposed, that the radial resistance to deformation, in particular the resistance to expansion, of the jacket hose or jacket tube is larger than the radial resistance to deformation, in particular the compressibility of the supply line. Expansion of the jacket hose and the enlargement of the volume of the interstitial space resulting therefrom is reduced, before the supply line is completely compressed.

In a further advantageous embodiment it is provided that the valve device for impinging the interstitial space with pressure medium, is arranged relative to the direction of flow of the coating means in the zone of, the end of the supply line associated with the coating means application device and the impingement of the interstitial space with pressure medium is effected counter to the direction of flow of the coating means at the time of processing the coating means. In virtue of the pressure build up, which extends counter to the direction of flow of the coating means, in the interstitial space, the coating means volume present in the supply line is pressed against the direction of flow of the coating means out of the supply line.

If gases or liquids are provided as pressure media, inasmuch as a closed pressure medium circuit is provided, the interstitial space between the supply line and the jacket hose or the jacket tube is closed gas-tight of at least liquid-tight vis-a-vis the environment and the supply and removal of the pressure medium is provided via inlet and outlet valves that are separated from each other. If air is used as the pressure medium, then an open pressure medium circuit can also be provided; that is, the air is blown into the surrounding air after the complete flow-through of the interstitial space, at the end of the supply line or a section of the supply line, via a baffle.

A further advantageous embodiment provides arranging the jacket hose or the jacket tube and the supply line coaxially to each other, whereby the inner periphery of the jacket hose corresponds approximately to the external periphery of the supply line. Advantageously in this arrangement is that the pliable elastic supply line, which necessarily also has a slight resistance against a radial expansion due to coating means pressure, is limited by the jacket tube with regard to its radial expansion; that is, it cannot burst.

With regard to the material pairings, it has been further shown to be advantageous to manufacture the jacket tube out of polyamide and the supply line out of polyurethane. Teflon or a Teflon-coated carrier hose comes also into consideration as an advantageous material for manufacturing the supply line.

BRIEF DESCRIPTION OF THE DRAWINGS

The invention is more completely described in the following exemplary description with reference to the embodiments represented in the drawings of a supply line for a painting system. The drawings show in FIG. 1 a diagrammatic, abbreviated representation of a supply line according to the invention for a painting system without impinging pressure medium, in longitudinal section.

DETAILED DESCRIPTION OF THE PREFERRED EMBODIMENT

Figure 1:
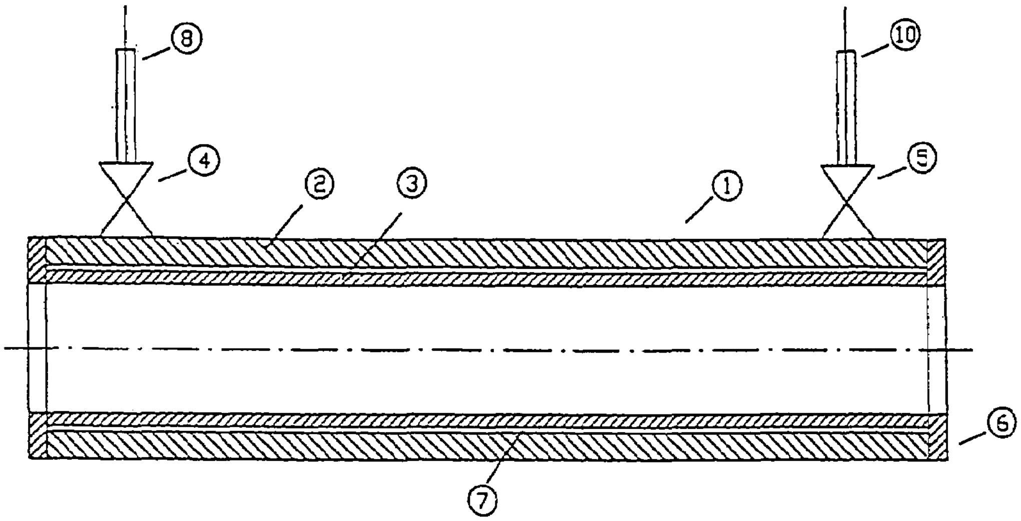
Figure 2:
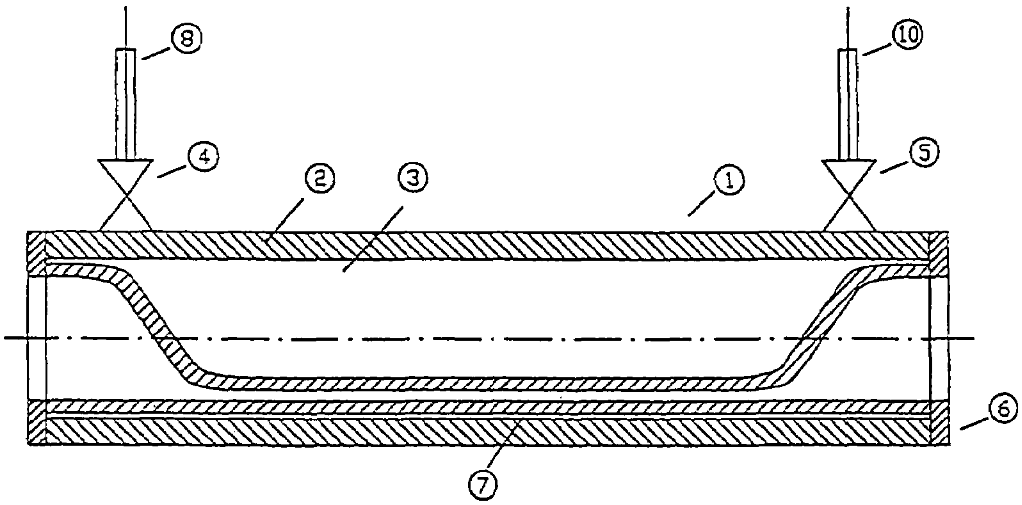
FIG. 2 a diagrammatic, abbreviated representation of a supply line according to the invention for a painting system with impinging pressure medium, in longitudinal section.
Figure 3:
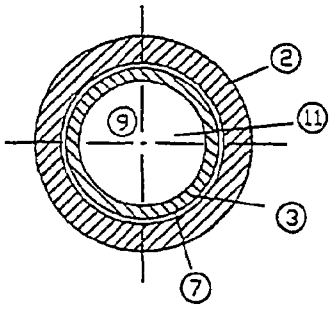
FIG. 3 representation in cross-section of a supply line according to the invention for a painting system without impinging pressure medium.
Figure 4:
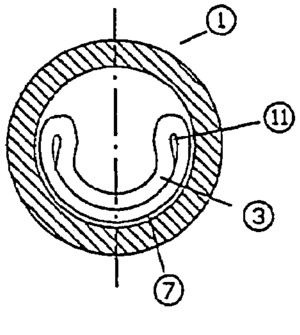
FIG. 4 representation in cross-section of a supply line according to the invention for a painting system with impinging pressure medium.

Only the parts of a painting system supply line with a supply line according to the invention necessary to an understanding of the invention are represented in the drawings. FIG. 1 represents a possible embodiment of a supply line (1), which essentially comprises the pliable elastic paint—conducting supply line (3) according to the invention, a jacket hose (2) surrounding the supply line (3), an inlet valve (4) connected to said jacket hose (2), an outlet valve (5) connected to the jacket hose, and two plug caps (6), seal the interstitial or annular space (7) between the jacket hose (2) and the paint—conducting hose (3) at both ends of the supply line vis-à-vis the environment. To clean the paint—conducting supply line (3) the interstitial space (7) between the jacket sleeve (2) and the supply line (3) is impinged using a pressurized gas via a pressure medium line (8) and the inlet valve (4), which communicates with the interstitial space (7). As represented in FIG. 2, the paint—conveying supply line (3) of the supply line (1) is initially deformed or compressed in the zone of the inlet valve (4). This deformation or the compression of the paint—conveying hose (3) progresses over the entire length of the supply line (3) with continued supply of pressure medium and in virtue of the build-up of the pressure of the pressure medium. Because the pressure medium pressure propagates in the jacket hose (2) in the interstitial space (7) counter to the actual direction of flow of the paint with paint processing, the paint column (9) present in the paint—carrying hose (3) is pressed counter to the actual direction of flow of the paint and out of the supply line (3). After the paint column (9) has been ejected from the paint—conveying hose (3), the pressure medium is then removed via the outlet valve (5) and the discharge hose (10). Here it must be noted, that the outlet valve (5) can be combined with the inlet valve (5) and the pressure medium can be expressed via this inlet/outlet valve by the paint column building up in the supply line (3) when the painting machine is used. FIG. 4 represents a cross-section of the supply line (3) impinged with the gaseous pressure medium. The considerable reduction of the remaining paint passage cross-section (11) due to the compression or the folding into itself of the supply line (3) as a result of the application of the pressure medium can be clearly seen in this representation. The residual paint remaining in the paint passage cross-section (11) is then, corresponding to current practice, flushed out using solvent.

The invention claimed is:

1. A supply line (3) for supplying or charging of coating application devices of a coating system, in particular the paint application device of a painting system with coating means such as, for example, paint, from one or a plurality of coating means containers or reservoirs, wherein the supply line has a valve device, which makes it possible that the coating means volume present in the supply line (3) is displaced counter to the direction of flow back into a coating means container or into a supply line, and the supply line (3) consists of a flexible, radially compressible hose (3), and this hose (3) is surrounded by a jacket hose or jacket tube (2), wherein the interstitial space (7) between the flexible hose (3) and the jacket hose or jacket tube (2) is impinged with a pressure medium by means of at least one valve device (4) connected with the interstitial space (7), and the supply line (3) can be compressed radially by application of a pressure medium on the external periphery, so that the coating means passage cross-section is minimized and any coating means volume present in the supply line is forced out, and wherein the valve device (4) for impinging the interstitial space (7) between the jacket hose or jacket tube (2) and supply line (3) relative to the direction of flow of the coating means is arranged in the zone of the end of the supply line remote from the one or the plurality of containers, so that impinging of the interstitial space (7) is done with a pressure medium flowing in a direction opposite the direction of flow of the coating means at the time of application of the coating means.

2. The supply line according to claim 1, wherein the walls of the supply line can be collapsed by impinging of the external periphery with a pressure medium.

3. The supply line according to claim 1, wherein the interstitial space between the supply line and the jacket hose or jacket hose is closed gas-tight vis-à-vis the environment, and the supply and removal of the pressure medium is done via inlet and outlet valves that are separated from each other.

4. Supply lines according to claim 3, wherein the pressure medium consists of air, and the pressure medium is passed in an open circuit.

5. The supply line according to claim 1, wherein the supply line consists of polytetrafluoroethylene (PTFE) or a PTFE—coated/carrier hose.

6. The supply line according to claim 1, wherein the supply line consists of polyurethane, and the jacket hose or jacket tube is comprised of polyamide.

* * * * *